(12) United States Patent
Bares et al.

(10) Patent No.: US 7,305,345 B2
(45) Date of Patent: Dec. 4, 2007

(54) METHODS, SYSTEMS, AND COMPUTER PROGRAM PRODUCTS FOR PROVIDING AUTOMATED CUSTOMER SERVICE VIA AN INTELLIGENT VIRTUAL AGENT THAT IS TRAINED USING CUSTOMER-AGENT CONVERSATIONS

(75) Inventors: William Bares, Raleigh, NC (US); Bradford Mott, Apex, NC (US); Luke Zettlemoyer, Cambridge, MA (US); James Lester, Raleigh, NC (US)

(73) Assignee: Livewire Acquisition, Inc., Columbus, OH (US)

( * ) Notice: Subject to any disclaimer, the term of this patent is extended or adjusted under 35 U.S.C. 154(b) by 1013 days.

(21) Appl. No.: 10/076,963

(22) Filed: Feb. 15, 2002

(65) Prior Publication Data

US 2002/0111811 A1  Aug. 15, 2002

Related U.S. Application Data

(60) Provisional application No. 60/269,032, filed on Feb. 15, 2001.

(51) Int. Cl.
*G10L 15/22* (2006.01)
*H04M 1/64* (2006.01)

(52) U.S. Cl. .................... 704/275; 379/88.01

(58) Field of Classification Search ............... 704/275, 704/231, 257; 379/88; 376/266; 706/45–47; 707/1, 104
See application file for complete search history.

(56) References Cited

U.S. PATENT DOCUMENTS

| | | | |
|---|---|---|---|
| 5,822,727 A * | 10/1998 | Garberg et al. | 704/270.1 |
| 5,983,190 A | 11/1999 | Trower, II et al. | |
| 6,031,549 A | 2/2000 | Hayes-Roth | |
| 6,052,679 A | 4/2000 | Aparicio, IV et al. | |
| 6,064,968 A | 5/2000 | Schanz | |
| 6,070,149 A | 5/2000 | Tavor et al. | |
| 6,138,139 A * | 10/2000 | Beck et al. | 709/202 |
| 6,324,499 B1 * | 11/2001 | Lewis et al. | 704/233 |
| 6,356,869 B1 * | 3/2002 | Chapados et al. | 704/275 |
| 6,377,944 B1 * | 4/2002 | Busey et al. | 707/3 |
| 6,567,805 B1 * | 5/2003 | Johnson et al. | 707/5 |
| 6,711,585 B1 * | 3/2004 | Copperman et al. | 707/104.1 |
| 6,728,702 B1 * | 4/2004 | Subramaniam et al. | 707/3 |
| 6,751,591 B1 * | 6/2004 | Gorin et al. | 704/257 |
| 6,823,313 B1 * | 11/2004 | Yuchimiuk et al. | 704/275 |
| 6,839,671 B2 * | 1/2005 | Attwater et al. | 704/255 |
| 2001/0049688 A1 * | 12/2001 | Fratkina et al. | 707/104.1 |

* cited by examiner

Primary Examiner—Tálivaldis Ivars Šmits
(74) Attorney, Agent, or Firm—Myers Bigel Sibley & Sajovec PA

(57) ABSTRACT

A customer communication is responded to by receiving an utterance from the customer at an agent that executes on a data processing system. The agent uses a knowledge base that includes information extracted from one or more exemplary conversations to generate a response to the received utterance. The agent then sends the generated response to the customer.

66 Claims, 9 Drawing Sheets

METHODS, SYSTEMS, AND COMPUTER PROGRAM PRODUCTS FOR PROVIDING AUTOMATED CUSTOMER SERVICE VIA AN INTELLIGENT VIRTUAL AGENT THAT IS TRAINED USING CUSTOMER-AGENT CONVERSATIONS

CROSS-REFERENCE TO PROVISIONAL APPLICATION

This application claims the benefit of Provisional Application Ser. No. 60/269,032, filed Feb. 15, 2001, entitled Methods, Systems, and Computer Program Products for Providing Automated Customer Service Via an Intelligent Virtual Agent that is Trained Using Customer-Agent Conversations, the disclosure of which is hereby incorporated herein by reference in its entirety as if set forth fully herein.

BACKGROUND OF THE INVENTION

The present invention relates generally to the field of artificial intelligence and, more particularly, to the use of artificial intelligence to provide automated customer service.

As the Internet has evolved into a viable commercial medium, more businesses have developed Web sites to market and sell their products and/or services electronically. As businesses grow, call center and e-mail traffic may continue to escalate. This has resulted in customer service being a relatively fast growing segment of the customer relations management (CRM) market. It may, however, be expensive to provide numerous sales/customer service representatives to handle customer queries through call centers and/or e-mail systems. Hoping to deflect escalating call center and/or e-mail service expenses while enhancing the customer experience, businesses may turn to self-service solutions. Thus, there exists a need for improved customer service systems, such as Web self-service solutions, that may allow businesses to increase operating efficiencies and turn customer service into a revenue-generating channel.

SUMMARY OF THE INVENTION

According to embodiments of the invention, a customer communication is responded to by receiving an utterance from the customer at an agent that executes on a data processing system. The agent uses a knowledge base that comprises information extracted from one or more exemplary conversations to generate a response to the received utterance. The agent then sends the generated response to the customer.

In other embodiments of the invention, the agent generates the response by analyzing the received utterance based on one or more prior utterances received from the customer, one or more prior responses sent from the agent to the customer, and/or the knowledge base.

In other embodiments of the invention, a conversation model is maintained that is representative of one or more prior utterances received from the customer and one or more prior responses that have been sent from the agent to the customer. The current state of the conversation model is updated based on the utterance received from the customer.

In other embodiments of the present invention, the utterance received from the customer and/or the conversation model may be sent to a customer service representative. The customer service representative may provide a notification of intent to communicate with the customer and may select one or more responses generated by the agent to send to the customer.

In still other embodiments of the present invention, the agent may receive a proposed response from the customer service representative and may determine whether the proposed response is appropriate to send to the customer. If the proposed response is determined to be inappropriate, then the proposed response may be sent to a supervisor for approval.

In further embodiments of the present invention, an agent may be trained to respond to a customer communication by compiling one or more exemplary conversations, which comprise an exchange of utterances. The conversations are annotated to categorize the information contained therein and then processed using a machine learning engine to populate a knowledge base.

In still further embodiments of the present invention, a user is presented with multiple categories for annotating a conversation and, based on the user's input, parts of the conversations are associated with respective ones of the categories. The conversation parts may comprise sentences and words and it may be verified that all words that are determinative to the meaning of utterances comprising the conversation are annotated.

Although the present invention has been described above primarily with respect to method aspects of the invention, it will be understood that the present invention may be embodied as methods, systems, and computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1:
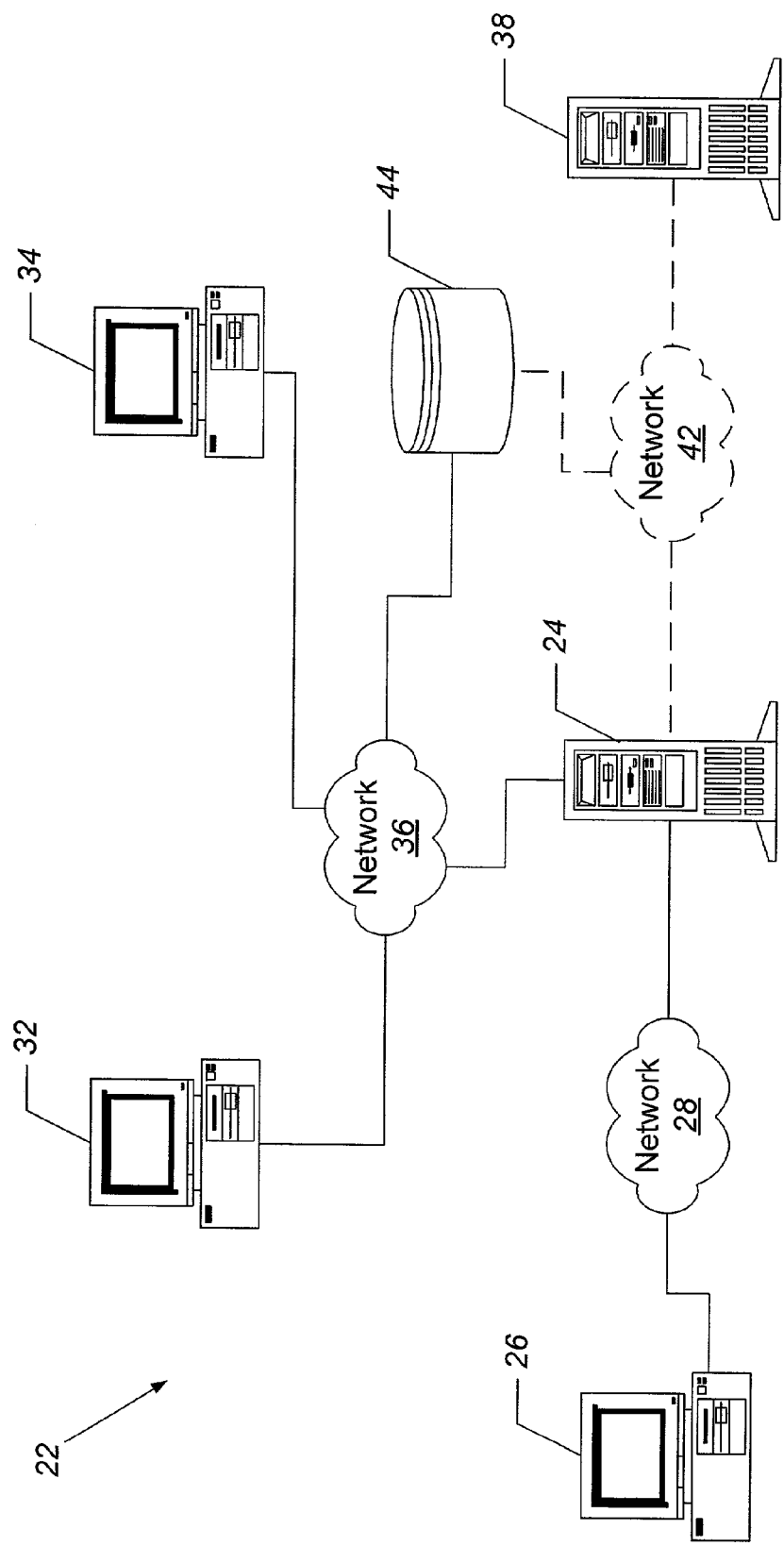
FIG. 1 is a block diagram that illustrates communication networks for providing automated customer service in accordance with embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

The present invention may be embodied as methods, systems, and/or computer program products. Accordingly, the present invention may be embodied in hardware and/or in software (including firmware, resident software, microcode, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

FIG. 1 is a block diagram that illustrates communication networks for providing automated customer service in accordance with embodiments of the present invention. An exemplary communication system 22 network architecture comprises a server data processing system 24 that is coupled to one or more customer data processing systems 26 over a network 28. The server data processing system 24 is further coupled to a customer service representative (CSR) data processing system 32 and a supervisor data processing system 34 over a network 36. Optionally, the server data processing system 24 may be coupled to an intelligent virtual agent (IVA) data processing system 38 over a network 42.

The server data processing system 24 may be configured with computational, storage, and control program resources for providing automated customer service in accordance with embodiments of the present invention. The IVAs that facilitate automated customer service may be implemented on the server data processing system 24 or, alternatively, on the separate data processing system 38, which communicates with the server data processing system 24 over the network 42. Customers communicate with the server data processing system 24 via data processing systems 26 over the network 28. The customer data processing system 26 may be, for example, a desktop computer, a Personal Communications System (PCS) terminal that may combine a cellular radiotelephone with data processing and data communications capabilities; a personal digital assistant (PDA) that can include a radiotelephone, pager, Internet/intranet access, Web browser, organizer, calendar and/or a global positioning system (GPS) receiver; and a conventional laptop/palmtop receiver, and/or an Internet appliance that includes a communication transceiver. The customer data processing system 26 may represent a class of devices sometimes referred to as "pervasive computing" devices.

The CSR data processing system 32 and the supervisor data processing system 34 may be implemented in like fashion to the customer data processing system 26. A CSR may communicate with a customer, with the assistance of an IVA residing on either the server data processing system 24 and/or the IVA data processing system 38, through the CSR data processing system 32, the server data processing system 24, and the networks 36 and 28. An IVA may communicate with a customer service supervisor as necessary via the supervisory data processing system 34 and the network 36.

The server data processing system 24 and/or the IVA data processing system 38 may be implemented as a single processor system, a multi-processor system, or even a network of stand-alone computer systems. The server data processing system 24 and/or the IVA data processing system 38 may communicate with a data storage repository 44 for storing, for example, log files of conversations between IVAs/CSRs and customers. These files may be edited by a CSR or another party responsible for maintaining the IVA and associated automated customer service software on the server data processing system 24 and/or the IVA data processing system 38 for use in training the IVA subsystem.

The networks 28, 36, and 42 may represent global networks, such as the Internet, or other networks accessible by the general public. The networks 28, 36, and 42 may also, however, represent wide area networks, local area networks, Intranets, or other private networks, which are not accessible by the general public. Furthermore, the networks 28, 36, and 42 may represent a combination of public and private networks or a virtual private network (VPN). In view of the foregoing, even though networks 28, 36, and 42 are illustrated in FIG. 1 as separate networks, the networks 28, 36, and 42 may nevertheless be embodied as a single network.

Although FIG. 1 illustrates an exemplary communication system 22 network architecture that may be used to provide automated customer service in accordance with embodiments of the present invention, it will be understood that the present invention is not limited to such a configuration but is intended to encompass any configuration capable of carrying out the operations described herein.

Figure 2:
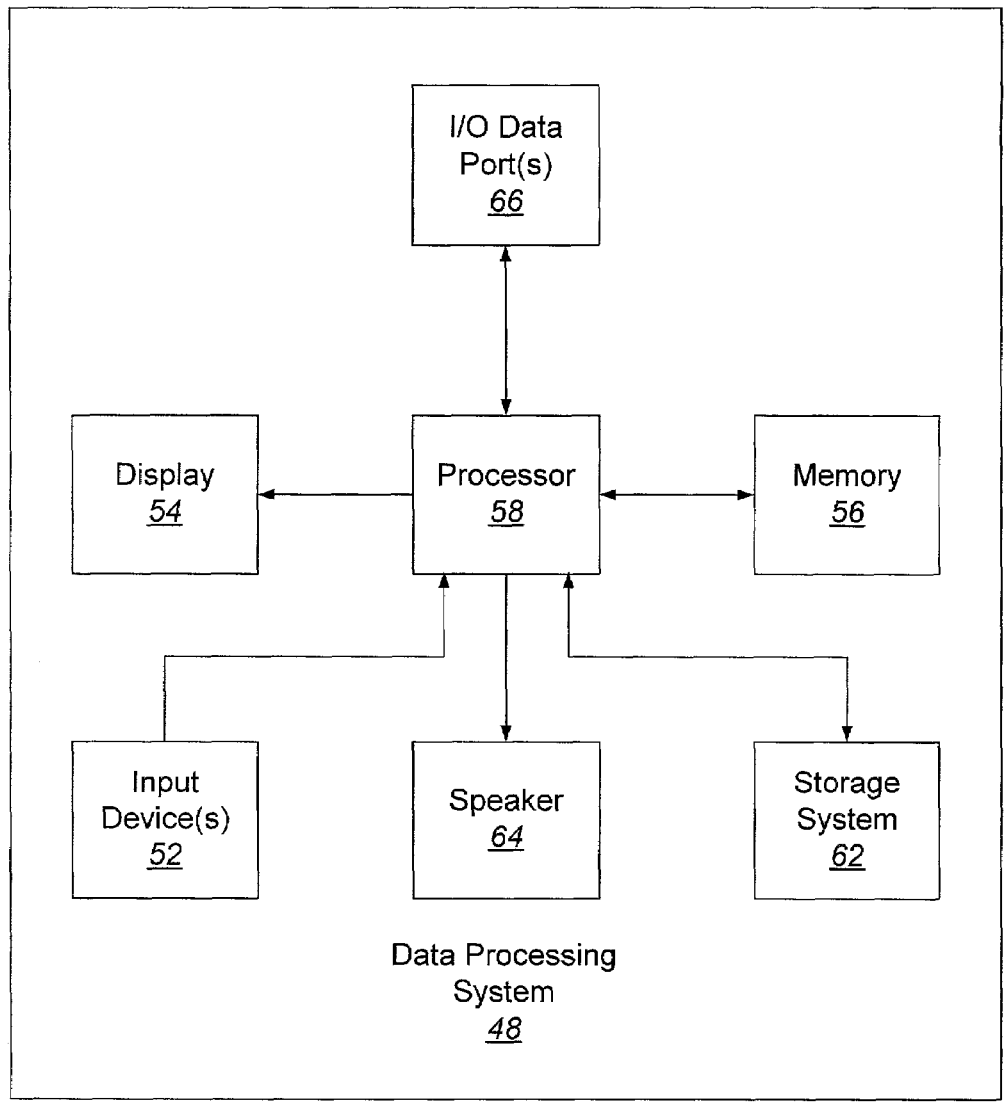
FIG. 2 is a block diagram that illustrates data processing systems in accordance with embodiments of the present invention.

Referring now to FIG. 2, an exemplary data processing system 48 architecture is illustrated, which may be used in embodiments of the server data processing system 24, the customer data processing system 26, the CSR data processing system 32, the supervisor data processing system 34, and/or the IVA data processing system 38, in accordance with the present invention. The data processing system 42 may include input device(s) 52, such as a keyboard or keypad, a display 54, and a memory 56 that communicate with a processor 58. The data processing system 48 may further include a storage system 62, a speaker 64, and an input/output (I/O) data port(s) 66 that also communicate with the processor 58. The storage system 62 may include removable and/or fixed media, such as floppy disks, ZIP drives, hard disks, or the like, as well as virtual storage, such as a RAMDISK. The I/O data port(s) 66 may be used to transfer information between the data processing system 48 and another computer system or a network (e.g., the Internet). These components may be conventional components such as those used in many conventional computing devices, which may be configured to operate as described herein.

Figure 3:
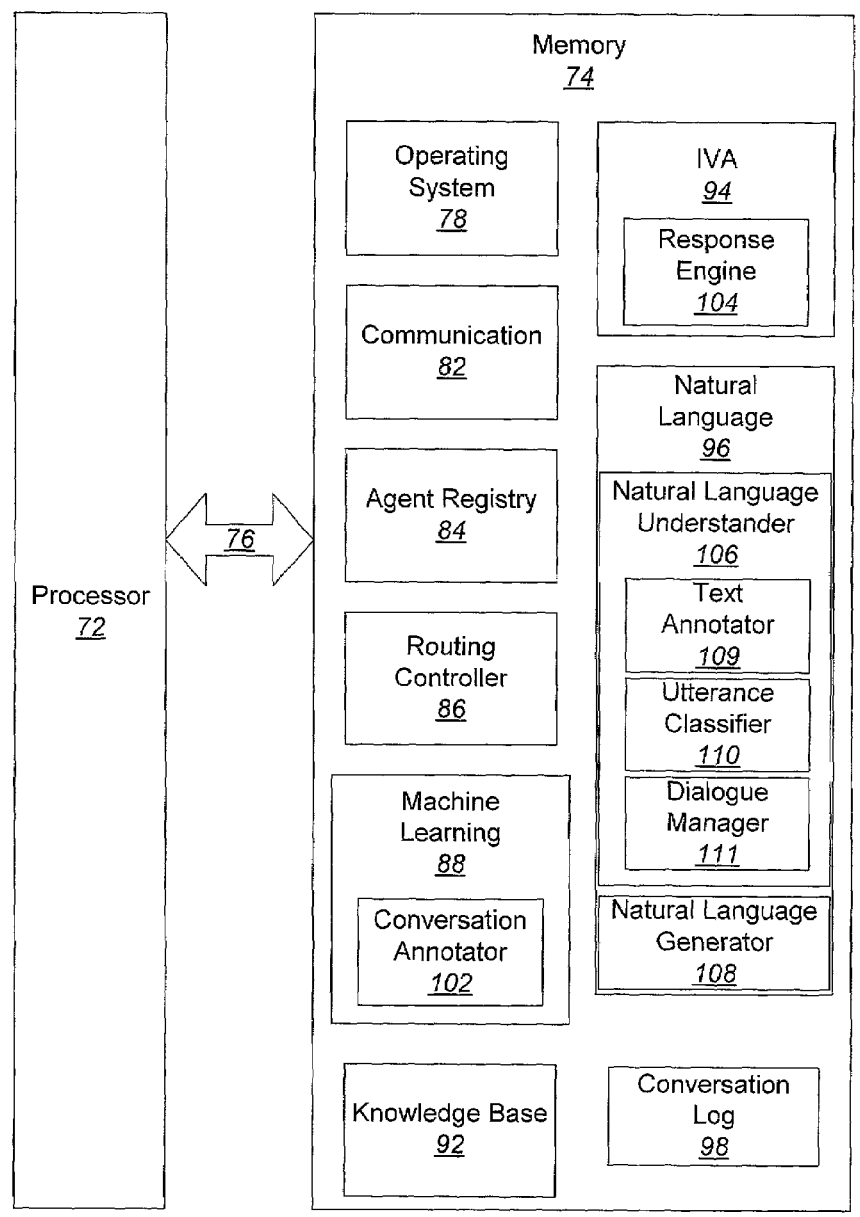
FIG. 3 is a software architecture block diagram that illustrate methods, systems, and computer program products for providing automated customer service in accordance with embodiments of the present invention.

FIG. 3 illustrates a processor 72 and a memory 74 that may be used in embodiments of the server data processing system 24 for providing automated customer service in accordance with the present invention. The processor 72 communicates with the memory 74 via an address/data bus 76. The processor 72 may be, for example, a commercially available or custom microprocessor. The memory 74 is representative of the overall hierarchy of memory devices containing the software and data used to provide automated customer service in accordance with embodiments of the present invention. The memory 74 may include, but is not limited to, the following types of devices: cache, ROM, PROM, EPROM, EEPROM, flash, SRAM, and DRAM.

As shown in FIG. 3, the memory 74 may contain up to nine or more major categories of software and/or data: the operating system 78, the communication program module 82, the agent registry program module 84, the routing controller program module 86, the machine learning program module 88, the knowledge base 92, the IVA program module 94, the natural language program module 96, and the conversation log 98. The operating system 78 controls the operation of the computer system. In particular, the operating system 78 may manage the computer system's resources and may coordinate execution of programs by the processor 72. The communication program 82 may be configured to communicate information between the server data processing system 24 and the other data processing systems in the communication network 22 of FIG. 1 using suitable communication protocol(s). The communication program 82 may also comprise code for providing a graphical user interface (GUI) to customers to facilitate communication therewith.

The agent registry 84 may be configured to manage the IVAs as a system resource. That is, the agent registry assigns an IVA to a new customer and returns the IVA to an available pool once the conversation between the IVA and a customer is complete. The routing controller 86 may be configured to communicate with the agent registry so as to provide a CSR access to a particular customer under the supervision of the IVA associated with that customer.

The machine learning program 88 may be configured to populate the knowledge base 92 by processing exemplary conversations between a customer and an IVA. More specifically, the machine learning program 88 may comprise a conversation annotator module 102 that may be used to annotate conversations to thereby categorize the information contained in the conversations. The machine learning program 88 may process these annotated conversations to populate the knowledge base 92. In addition to the information derived from the exemplary conversations, the knowledge base 92 may include online word dictionaries, programmed rules and fact tables, and/or information databases. In accordance with embodiments of the present invention, the machine learning program 88 may facilitate the incorporation of knowledge through synonym sets, hand programming, machine learning, and/or database lookups. The "knowledge" may be organized in terms of "phrase sets," which are similar to conventional grammatical phrases, but are generally less restrictive. For example, a phrase set hierarchy may be used in which a highest level includes utterances that may be recognized, a middle level includes types and organized groups of words, such as dates, addresses, etc., and a lower level includes individual words that may be recognized and/or associated with each other, such as synonyms.

The IVA program 94 may be configured to provide a plurality of IVAs that communicate with customers over the network 28 as shown in FIG. 1. The IVA program 94 comprises a response engine module 104 that may be used to generate responses to communications received from customers based on the information contained in the knowledge base 92. In more detail, the response engine module 104 cooperates with the natural language program 96 to analyze communications received from customers based on information contained in the knowledge base 92. The natural language program 96 takes text produced by a customer or customer service representative and produces responses that are appropriate for the current conversational context. The context may include the current web page, the current state of active web applications that are executing, and the conversational history. The natural language program 96 comprises a natural language understander module 106 and a natural language generator module 108, which are described in more detail hereafter.

The natural language understander module 106 is provided with the text and context information described above and computes a new set of dialogue states. The natural language understander module 106 comprises three modules, in accordance with embodiments of the present invention: a text annotator module 109, an utterance classifier module 110, and a dialogue manager module 111.

The text annotator module 109 is provided with the text and context information, which it uses to create an annotated utterance. The annotated utterance may comprise a hierarchical representation that includes information used for understanding an utterance. This hierarchical representation may include labels for individual words for part of speech, alternate spellings, as well as the extraction of application-specific information such as dates, times, and product names.

The utterance classifier module 110 is provided with the annotated utterance and determines the most probable utterance classification category to which the utterance belongs. This determination may be based on the features noted above in the annotated utterance, as well as the elements of the conversational context noted above. The classification may be computed by various classification algorithms, such as Bayesian classification, heuristic rule-based classification, and/or neural network classification techniques, in accordance with embodiments of the present invention.

The dialogue manager module 111 is provided with the classification computed by the utterance classifier module 110, as well as the annotated utterance and the current context information. The dialogue manager 111 determines a set of probable dialogue states to which the conversation has transitioned. Its representation may be controlled by computational mechanisms, such as a finite state machine and/or a hidden Markov model.

The resulting set of dialogue states, with probabilistic annotations, as well as the annotated utterance and the other elements of the context information, are used by the natural language generator module 108 to create an utterance that is responsive to the user's utterance (e.g., a question, request, and/or statement). The response utterance is then instantiated with context-specific information using techniques, such as template-based generation and/or grammar-based generation. The natural language generator module 108 may create a textual response, as well as a context-specific response that may include elements such as web content, relevant search links, and/or rich media (e.g., animation and/or video).

The conversation log 98 may be used to store conversations between customers and IVAs. The machine learning program 88 may process these logged conversations as discussed above so as to improve the knowledge base 92.

It will be understood that the machine learning program 88, the knowledge base 92, the IVA program 94, the natural language program 96, and sub-combinations thereof may be implemented on the server data processing system 24 and/or the IVA data processing system 38 in accordance with embodiments of the present invention. Moreover, the conversation log 98 may be stored on the data storage repository 44 where the CSRs may access the stored conversations through the network 36.

Although FIG. 3 illustrates an exemplary software architecture that may be used for providing automated customer service in accordance with embodiments of the present invention, it will be understood that the present invention is not limited to such a configuration but is intended to encompass any configuration capable of carrying out the operations described herein.

Computer program code for carrying out operations of the present invention may be written in an object-oriented programming language, such as Java, Smalltalk, or C++. Computer program code for carrying out operations of the present invention may also, however, be written in conventional procedural programming languages, such as the C programming language or compiled Basic (CBASIC). Furthermore, some modules or routines may be written in assembly language or even micro-code to enhance performance and/or memory usage.

The present invention is described hereinafter with reference to flowchart and/or block diagram illustrations of methods, systems, and computer program products in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

With reference to the flowcharts of FIGS. 4-12 and the architectural block diagrams of FIGS. 1 and 3, exemplary operations of methods, systems, and computer program products for providing automated customer service, in accordance with embodiments of the present invention, will be described hereafter.

Figure 4:
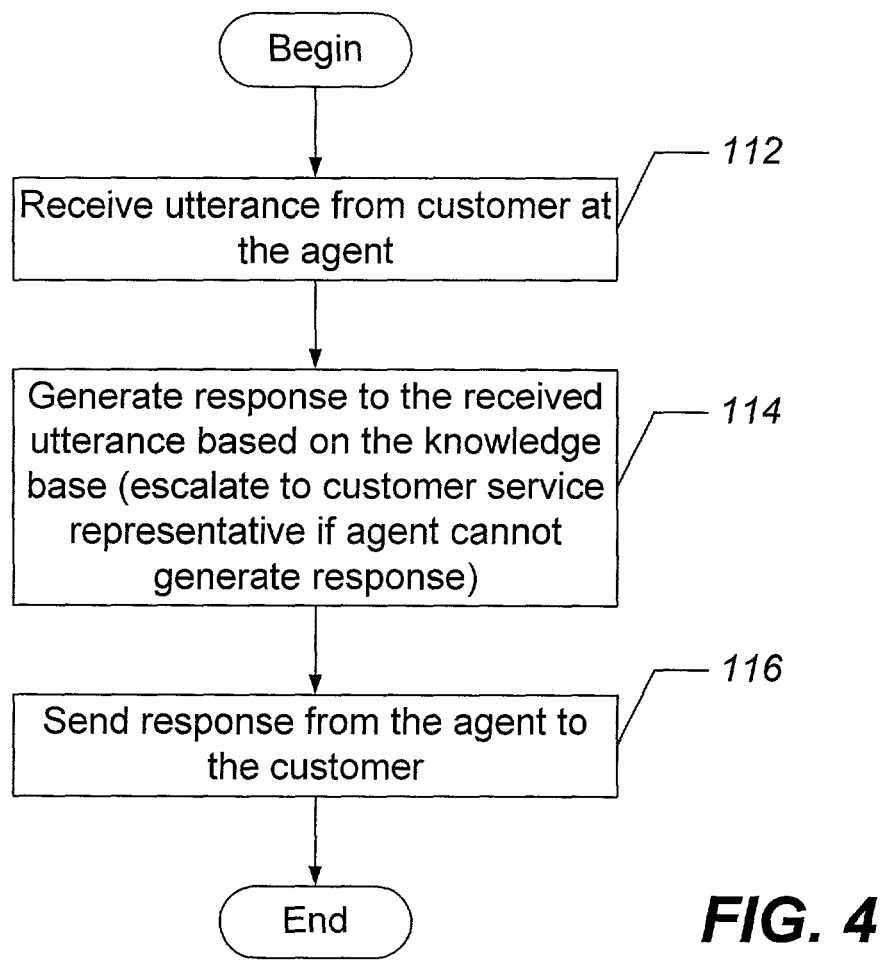
FIGS. 4-12 are flowcharts that illustrate exemplary operations of methods, systems, and computer program products for providing automated customer service in accordance with embodiments of the present invention.

Referring now to FIG. 4, operations begin with an IVA receiving an utterance from a customer (block 112). As used herein, "utterance" means a communicative act, which includes typing text, following Web links, verbal communication, etc., and "conversation" means an exchange of utterances. Note that an utterance could also be a failure to communicate affirmatively, such as a prolonged silence or idle period. After receiving the utterance from the customer, the agent (e.g., the IVA program 94) generates a response based on information contained in the knowledge base 92 (block 114). If, however, the IVA program 94 cannot generate a response because the utterance from the customer cannot be interpreted in light of the information currently stored in the knowledge base 92, then the IVA program 94 sends the received utterance to a CSR for generation of a response. That is, the IVA program 94 escalates the responsibility for constructing a response to the received customer utterance to a CSR. The response engine module 104 then sends the generated response to the customer (block 116).

Figure 5:
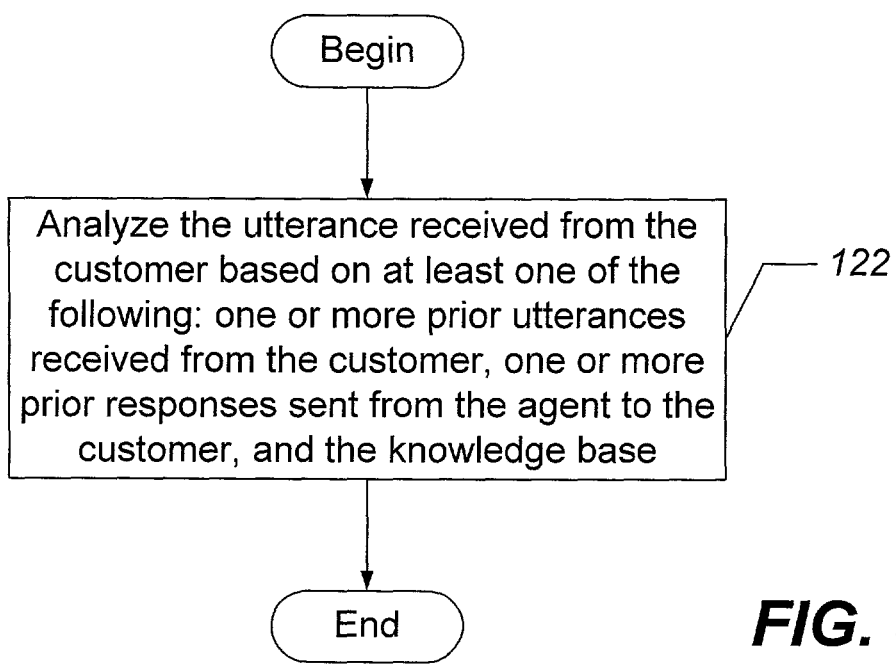

Exemplary operations for generating the response to the customer utterance are illustrated in FIG. 5. The IVA program 94 passes the customer utterance to the natural language program 96, which processes the customer utterance using the natural language understander module 106 and the natural language generator module 108. The natural language understander module 106 analyzes the customer utterance using one or more of the following criteria: the knowledge base 92, prior utterances received from the customer, and prior responses sent from the agent to the customer (block 122). Advantageously, the prior utterances received from the customer and the prior responses sent from the agent to the customer may provide a contextual framework for analyzing the customer utterance. The natural language generator module 108 provides a response based on the results of the analysis to the response engine module 104, which sends the response to the customer.

As part of the analysis performed by the natural language understander module 106, the utterance received from the customer and/or part(s) of the utterance received from the customer are recognized based on information from the knowledge base 92. For example, an utterance may be viewed as comprising a plurality of data strings and recognizing a part of the utterance may comprise recognizing one of the plurality of data strings and/or a sub-combination of the plurality of data strings. The natural language understander module 106 may also recognize an utterance and/or a part of an utterance by associating the utterance and/or the part of the utterance with an information type that corresponds to a predefined information arrangement and a predefined information meaning. Examples of information types may include dates, times, phone numbers, product model numbers and/or names, etc.

Figure 6:
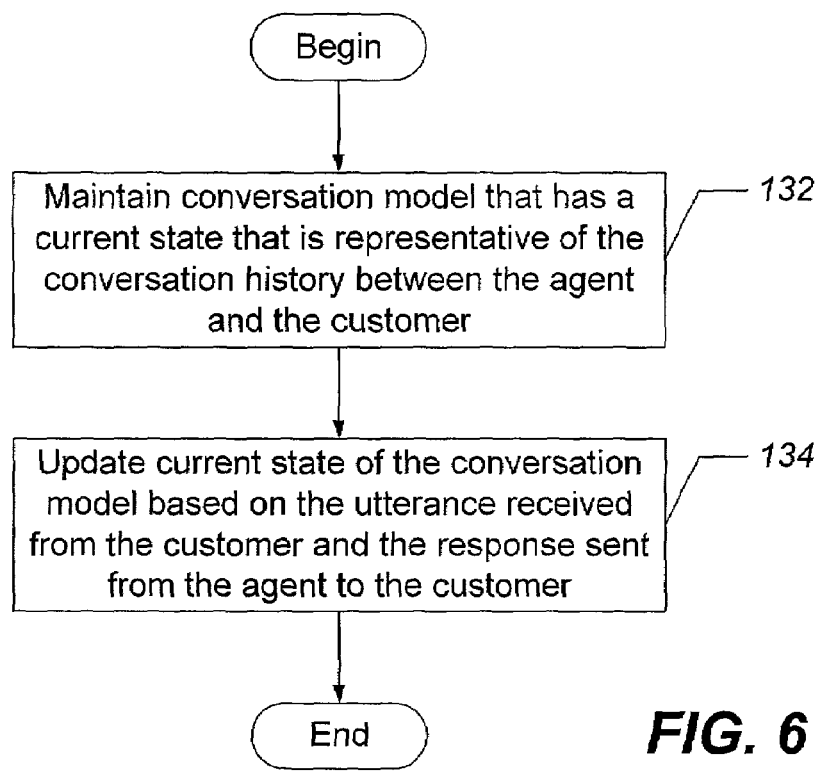

Referring now to FIG. 6, the IVA program 94 and the natural language program 96 cooperate to maintain a conversation model that has a current state that is representative of the conversation history between the agent and the customer (block 132), in accordance with further embodiments of the present invention. The IVA program 94 and the natural language program 96 update the current state of the conversation model based on the utterance received from the customer and the response sent from the agent to the customer (block 134). The conversation model may allow the IVA program 94 and/or the natural language program 96 to track the progress of the conversation between the agent and/or CSR and the customer and to induce structure to participate (i.e., generate responses) in the middle of a conversation even if a CSR has controlled the conversation and generated responses up to this point in the conversation.

Figure 7:
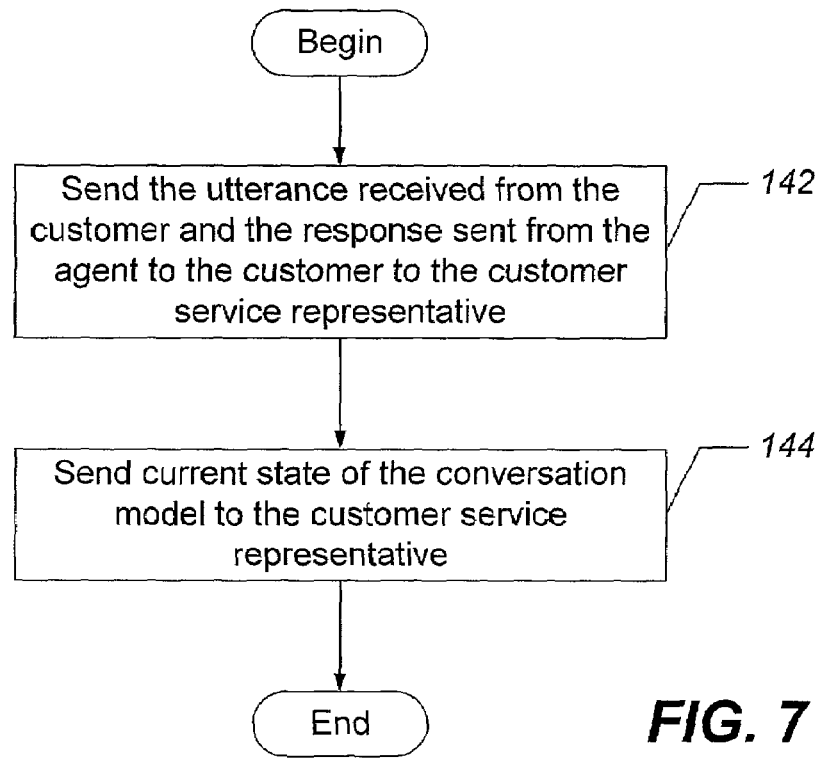

In accordance with further embodiments of the present invention, a CSR through the routing controller program 86 and the agent registry program 84 may monitor a conversation between an agent and a customer without taking control of the conversation. As illustrated in FIG. 7, the response engine module 104 sends to the CSR the utterance received from the customer and the response to the received customer utterance sent from the agent to the customer (block 142). The CSR may also observe the conversation state; therefore, the response engine module 104 sends the current state of the conversation module to the CSR (block 144).

Figure 8:
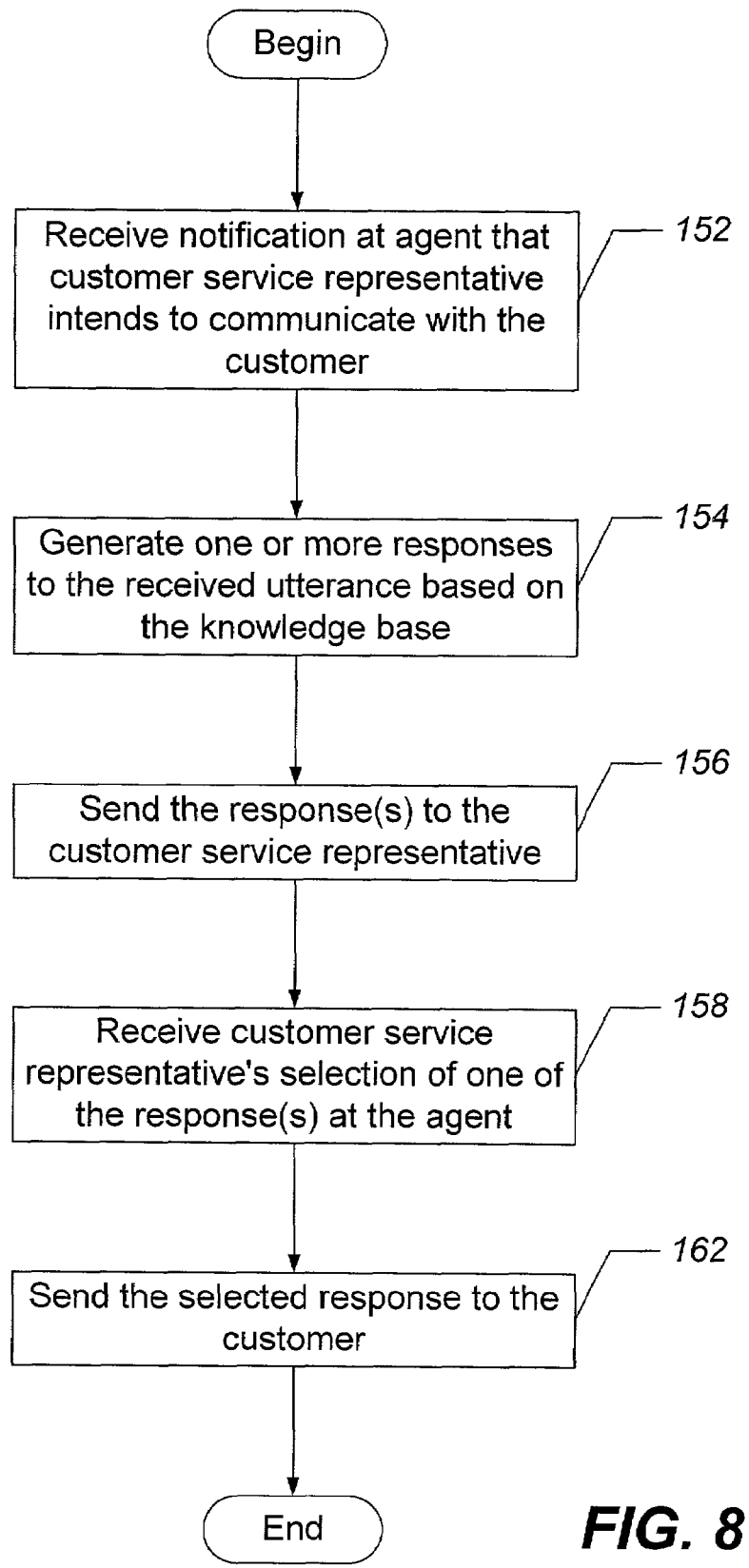

In addition to monitoring conversations, however, a CSR may take control of a conversation between a customer and an agent. Referring now to FIG. 8, the IVA program 94 receives a notification that the CSR intends to communicate with the customer (i.e., take control of the conversation) (block 152). When the CSR does not control the conversation (e.g., when the CSR is in monitoring mode), the natural language generator module 108 may discard less favorable responses based on the analysis of the customer utterance (see FIG. 5) and may provide only the most favorable response to the response engine module 104 to be sent to the customer. When the CSR has seized control of the conversation, however, the natural language generator module 108 may generate more than one possible response to send to the customer (block 154). The response engine module 104 sends these possible responses to the CSR (block 156) to allow the CSR to select which response to send to the customer. The IVA program receives the CSR's selection of one of the possible responses (block 158) and then the response engine module 104 sends the selected response to the customer (block 162).

Figure 9:
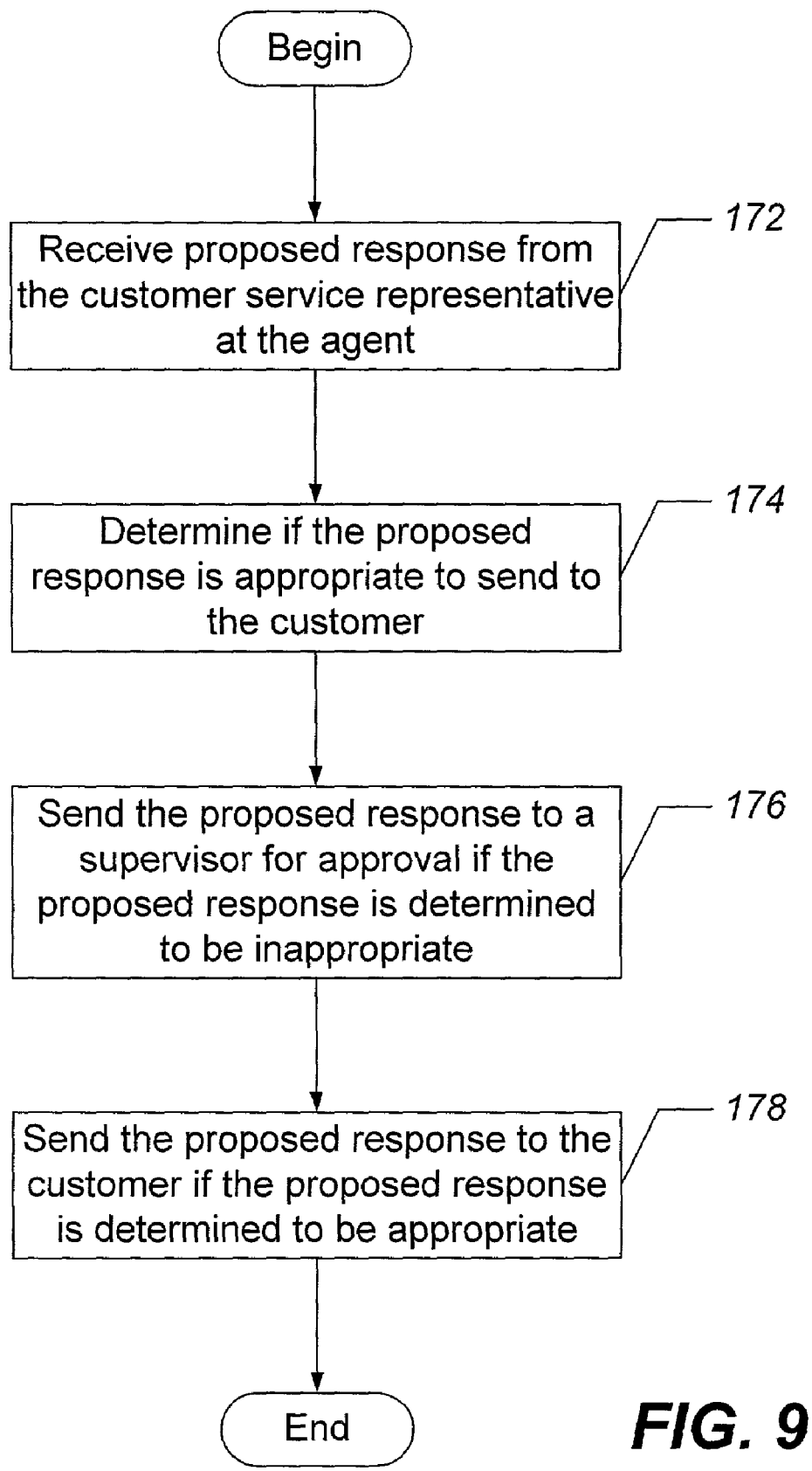

Referring now to FIG. 9, further embodiments of the present invention allow the CSR to propose a response to be sent to the customer. The IVA program 94 receives a proposed response from the CSR (block 172) and then makes a determination if the proposed response is appropriate to send to the customer (block 174). Thus, the agent may act as a filter to protect a customer from an inexperienced or angry CSR, for example. Specifically, the IVA program 94 sends the proposed response to a customer service supervisor for approval if the response is determined to be inappropriate (block 176). If the IVA program 94 determines that the proposed response from the CSR is appropriate, then the response engine module 104 sends the proposed response to the customer (block 178).

Figure 10:
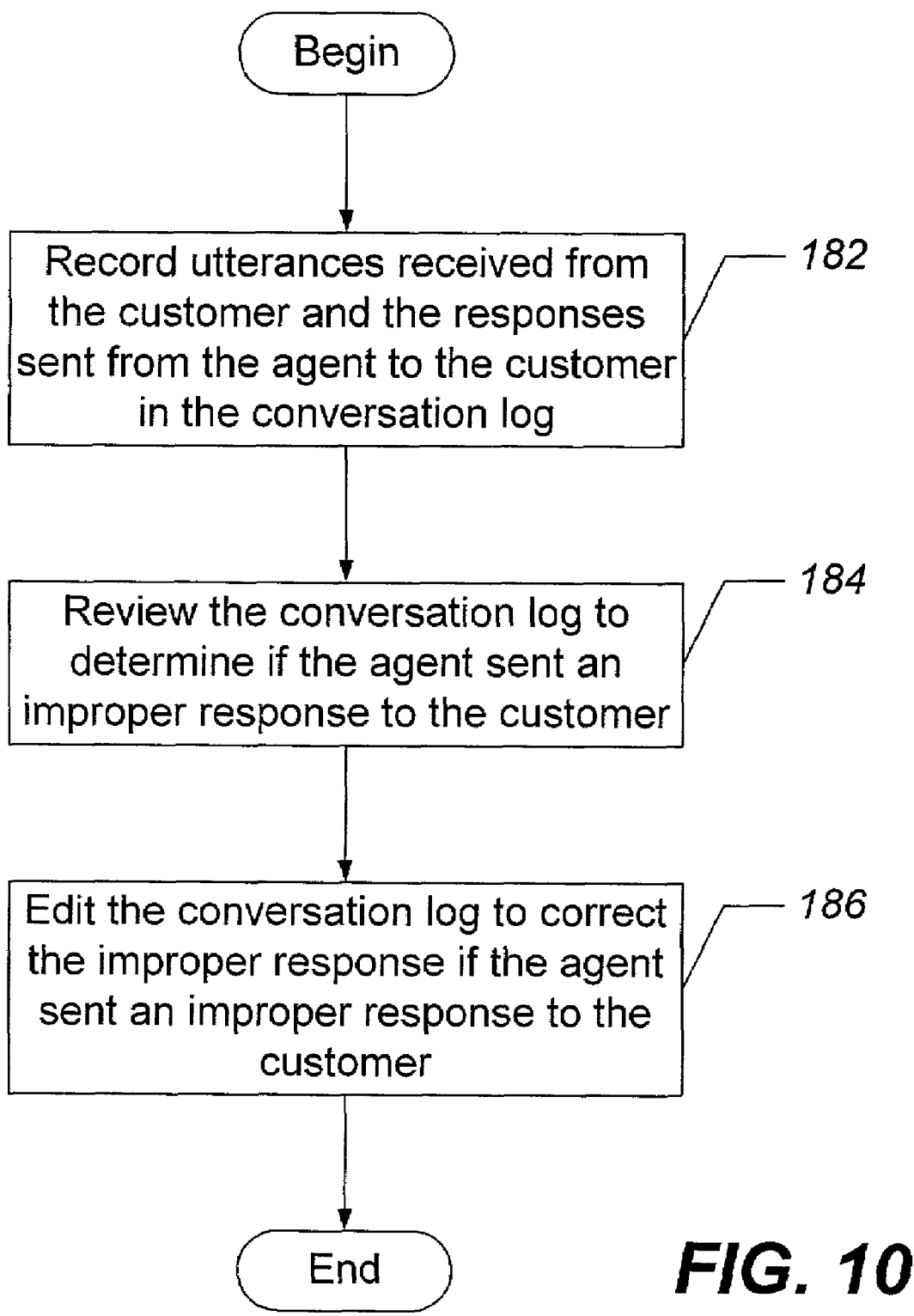

Referring now to FIG. 10, the IVA program 94 records utterances received from the customer and responses sent from the agent to the customer in the conversation log 98 (block 182), in accordance with further embodiments of the present invention. The machine learning program 88 may use these logged conversations to improve the knowledge base 92 as will be discussed in greater detail hereinafter. A CSR or other party responsible for maintaining the server data processing system 24 software may review conversations to determine if the agent sent an improper response to the customer (block 184). If an improper response is detected, the reviewing party edits the conversation log to correct the improper response (block 186) so that the machine learning program 88 may process the conversation containing the corrected response to incorporate the correct response into the knowledge base 92.

Figure 11:
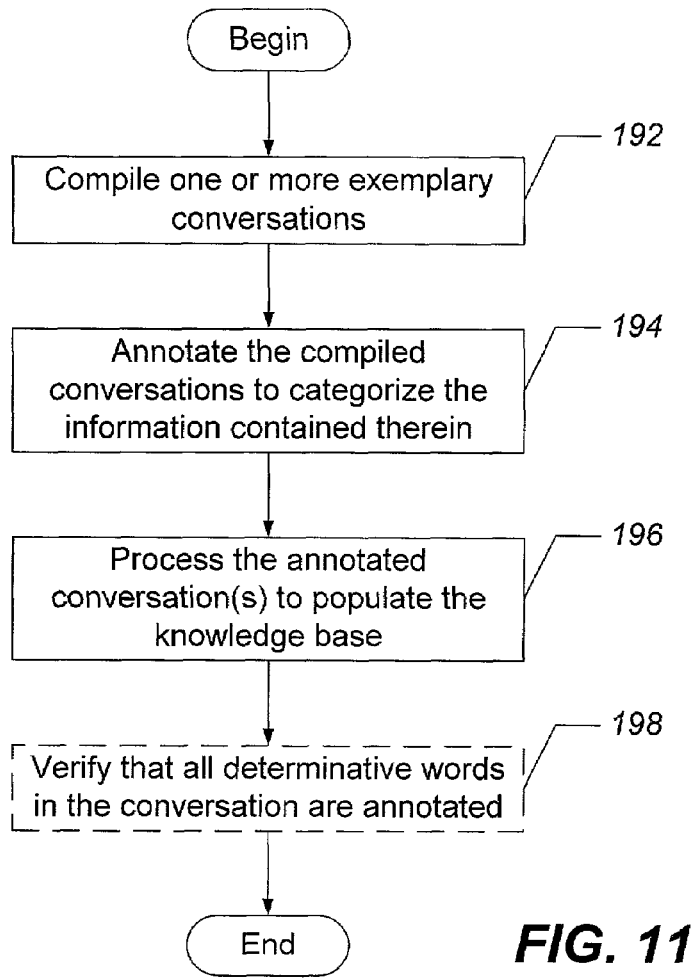

Referring now to FIG. 11, exemplary operations for training an agent to respond to an utterance from a customer will be described hereafter. Operations begin by compiling one or more exemplary conversations (block 192). These conversations may be edited conversations from the conversation log 98 as discussed hereinabove and/or they may be generated to illustrate common customer service exchanges between customers and customer service representatives. The conversation annotator module 102 annotates the compiled conversations to categorize the information contained therein (block 194). Annotation of the conversations maybe viewed as similarity based labeling of sentences, words, and/or phrases in the conversations. The machine learning program 88 processes the annotated conversations to extract information therefrom to populate the knowledge base 92 (block 196). Optionally, the machine learning program 88 analyzes the conversations to verify that all determinative words in the conversation are annotated (block 198). That is, words in the conversation that may be instrumental to a proper interpretation of the conversation may be required to have an annotation associated therewith.

Figure 12:
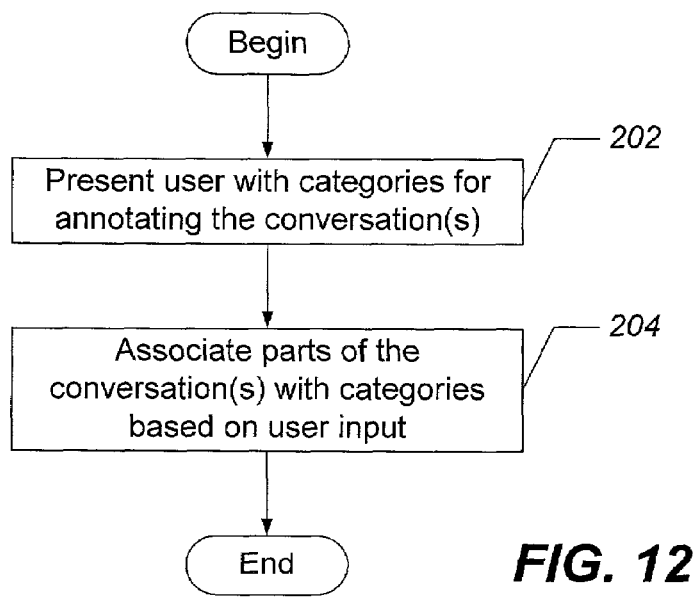

FIG. 12 illustrates further embodiments of the present invention in which the conversation annotator module 102 presents a user (e.g., a CSR or other party responsible for maintaining the server data processing system 24 software) with categories for annotating the conversations (block 202). For example, the conversations comprise utterances and the utterances comprise sentences and words. Therefore, the user may be presented with a plurality of categories based on intent for annotating sentences and a plurality of categories based on semantic content for annotating words (block 204).

The flowcharts of FIGS. 4-12 illustrate the architecture, functionality, and operations of an exemplary implementation of the server data processing system 24 and/or the IVA data processing system 38 software. In this regard, each block represents a module, segment, or portion of code, which comprises one or more executable instructions for implementing the specified logical function(s). It should also be noted that in other embodiments, the functions noted in the blocks may occur out of the order noted in FIGS. 4-12. For example, two blocks shown in succession may be executed substantially concurrently or the blocks may be executed in the reverse order, depending on the functionality involved.

Many variations and modifications can be made to the preferred embodiments without substantially departing from the principles of the present invention. All such variations and modifications are intended to be included herein within the scope of the present invention, as set forth in the following claims.

We claim:

1. A method of responding to a customer communication, comprising:
   receiving an utterance from the customer at an agent executing on a data processing system;
   generating a response to the utterance received from the customer at the agent based on a knowledge base that comprises information extracted from at least one exemplary conversation, wherein the at least one exemplary conversation comprises an exchange of utterances; and
   sending the response from the agent to the customer.

2. A method as recited in claim 1, wherein generating the response to the utterance received from the customer comprises:
   analyzing the utterance received from the customer based on at least one of the following: at least one prior utterance received from the customer, at least one prior response sent from the agent to the customer, and the knowledge base that comprises the information extracted from the at least one exemplary conversation.

3. A method as recited in claim 2, wherein the at least one prior utterance received from the customer and the at least one prior response sent from the agent to the customer provide a contextual framework for analyzing the utterance received from the customer.

4. A method as recited in claim 2, further comprising:
   maintaining a conversation model having a current state that is representative of the at least one prior utterance received from the customer and the at least one prior response sent from the agent to the customer; and updating the current state of the conversation model based on the utterance received from the customer and the response sent from the agent to the customer.

5. A method as recited in claim 2, wherein analyzing the utterance received from the customer comprises at least one of the following:

recognizing the utterance received from the customer based on the knowledge base that comprises the information extracted from the at least one exemplary conversation; and recognizing a part of the utterance received from the customer based on the knowledge base that comprises the information extracted from the at least one exemplary conversation.

6. A method as recited in claim 5, wherein the utterance received from the customer comprises a plurality of data strings, and wherein recognizing the part of the utterance received from the customer comprises at least one of the following:

recognizing a sub-combination of the plurality of data strings based on the knowledge base that comprises the information extracted from the at least one exemplary conversation; and recognizing one of the plurality of data strings based on the knowledge base that comprises the information extracted from the at least one exemplary conversation.

7. A method as recited in claim 5, wherein recognizing the utterance received from the customer comprises associating the utterance received from the customer with an information type that corresponds to at least one of a predefined information arrangement and a predefined information meaning.

8. A method as recited in claim 5, wherein recognizing the part of the utterance received from the customer comprises associating the part of the utterance received from the customer with an information type that corresponds to at least one of a predefined information arrangement and a predefined information meaning.

9. A method as recited in claim 2, further comprising:
sending the utterance received from the customer and the response sent from the agent to the customer to a customer service representative.

10. A method as recited in claim 9, wherein the at least one prior utterance received from the customer and the at least one prior response sent from the agent to the customer provide a contextual framework for analyzing the utterance received from the customer, the method further comprising:

maintaining a conversation model at the agent having a current state that is representative of the at least one prior utterance received from the customer and the at least one prior response sent from the agent to the customer;

updating the current state of the conversation model based on the utterance received from the customer and the response sent from the agent to the customer; and sending the current state of the conversation model to the customer service representative.

11. A method as recited in claim 1, further comprising:
receiving a notification from a customer service representative of intent to communicate with the customer.

12. A method as recited in claim 11, wherein generating the response to the utterance received from the customer comprises:

generating at least one response to the utterance received from the customer at the agent based on the knowledge base that comprises information extracted from the at least one exemplary conversation; and wherein sending the response from the agent to the customer comprises:

sending the at least one response to the customer service representative;

receiving a selection of one of the at least one response from the customer service representative at the agent; and sending the selected one of the at least one response from the agent to the customer.

13. A method as recited in claim 11, further comprising:
receiving a proposed response from the customer service representative at the agent;

determining if the proposed response is appropriate to send to the customer;

sending the proposed response to a supervisor for approval if the proposed response is determined to be inappropriate; and sending the proposed response to the customer if the proposed response is determined to be appropriate.

14. A method as recited in claim 1, further comprising:
recording the utterance received from the customer and the response sent from the agent to the customer in a conversation log.

15. A method as recited in claim 14, further comprising:
reviewing the conversation log to determine if the agent sent an improper response to the customer; and editing the conversation log to correct the improper response if the agent sent the improper response to the customer.

16. A method as recited in claim 1, wherein generating the response to the utterance received from the customer comprises:

determining if the response to the utterance received from the customer can be generated at the agent based on the knowledge base that comprises information extracted from the at least one exemplary conversation; and sending the utterance received from the customer to a customer service representative if the response cannot be generated at the agent based on the knowledge base that comprises information extracted from the at least one exemplary conversation; and generating the response to the utterance received from the customer at the customer service representative.

17. A method of training an agent to respond to a customer communication, comprising:

compiling at least one exemplary conversation, wherein the at least one exemplary conversation comprises an exchange of utterances;

annotating the compiled at least one conversation to categorize information contained therein;

processing The annotated at least one conversation using a machine learning engine to populate a knowledge base for use by the agent in generating a response to the customer communication.

18. A method as recited in claim 17, wherein annotating the compiled at least one conversation comprises:

presenting a user with a plurality of categories for annotating the at least one conversation; and associating respective ones of the plurality of categories with respective parts of the at least one conversation based on user input.

19. A method as recited in claim 18, wherein parts of the utterances comprising the at least one conversation comprise sentences and words.

20. A method as recited in claim 19, wherein presenting the user with the plurality of categories comprises:

presenting the user with a plurality of categories based on intent for annotating the sentences; and presenting the user with a plurality of categories based on semantic content for annotating the words.

21. A method as recited in claim 19, further comprising:

verifying that all words that are determinative to the meaning of utterances comprising The at least one conversation are annotated.

22. A method as recited in claim 17, wherein the at least one conversation comprises a conversation in which the agent was a participant.

23. A system for responding to a customer communication, comprising:

means for receiving an utterance from the customer at an agent executing on a data processing system;

means for generating a response to the utterance received from the customer at the agent based on a knowledge base that comprises information extracted from at least one exemplary conversation, wherein the at least one exemplary conversation comprises an exchange of utterances; and means for sending the response from the agent to the customer.

24. A system as recited in claim 23, wherein the means for generating the response to the utterance received from the customer comprises:

means for analyzing the utterance received from the customer based on at least one of the following: at least one prior utterance received from the customer, at least one prior response sent from the agent to the customer, and the knowledge base that comprises the information extracted flora the at least one exemplary conversation.

25. A system as recited in claim 24, wherein the at least one prior utterance received from the customer and the at least one prior response sent from the agent to the customer provide a contextual framework for analyzing the utterance received from the customer.

26. A system as recited in claim 24, further comprising:

means for maintaining a conversation model having a current state that is representative of the at least one prior utterance received from the customer and the at least one prior response sent from the agent to the customer; and means for updating the current state of the conversation model based on the utterance received from the customer and the response sent from the agent to the customer.

27. A system as recited in claim 24, wherein the means for analyzing the utterance received from the customer comprises at least one of the following:

means for recognizing the utterance received from the customer based on the knowledge base that comprises the information extracted from the at least one exemplary conversation; and means for recognizing a part of the utterance received from the customer based on the knowledge base that comprises the information extracted from the at least one exemplary conversation.

28. A system as recited in claim 27, wherein the utterance received from the customer comprises a plurality of data strings, and wherein the means for recognizing the part of the utterance received from the customer comprises at least one of the following:

means for recognizing a sub-combination of the plurality of data strings based on the knowledge base that comprises the information extracted from the at least one exemplary conversation; and means for recognizing one of the plurality of data strings based on the knowledge base that comprises the information extracted from the at least one exemplary conversation.

29. A system as recited in claim 27, wherein the means for recognizing the utterance received from the Customer comprises means for associating the utterance received from the customer with an information type that corresponds to at least one of a predefined information arrangement and a predefined information meaning.

30. A system as recited in claim 27, wherein the means for recognizing the part of the utterance received from the customer comprises associating the part of the utterance received from the customer with an information type that corresponds to at least one of a predefined information arrangement and a predefined information meaning.

31. A system as recited in claim 24, further comprising:

means for sending the utterance received from the customer and the response sent from the agent to the customer to a customer service representative.

32. A system as recited in claim 31, wherein the at least one prior utterance received from the customer and the at least one prior response sent from the agent to the customer provide a contextual framework for analyzing the utterance received from the customer, the system further comprising:

means for maintaining a conversation model at the agent having a current state that is representative of the at least one prior utterance received from the customer and the at least one prior response sent from the agent to the customer;

means for updating the current state of the conversation model based on the utterance received from the customer and the response sent from the agent to the customer; and means for sending the current state of the conversation model to the customer service representative.

33. A system as recited in claim 23, further comprising:

means for receiving a notification from a customer service representative of intent to communicate with the customer.

34. A system as recited in claim 33, wherein the means for generating the response to the utterance received from the customer comprises:

means for generating at least one response to the utterance received from the customer at the agent based on the knowledge base that comprises information extracted from the at least one exemplary conversation; and wherein the means for sending the response from the agent to the customer comprises:

means for sending the at least one response to the customer service representative;

means for receiving a selection of one of the at least one response from the customer service representative at the agent; and means for sending the selected one of the at least one response from the agent to the customer.

35. A system as recited in claim 33, further comprising:

means for receiving a proposed response from the customer service representative at the agent;

means for determining if the proposed response is appropriate to send to the customer;

means for sending the proposed response to a supervisor for approval if the proposed response is determined to be inappropriate; and means for sending the proposed response to the customer if the proposed response is determined to be appropriate.

36. A system as recited in claim 23, further comprising:
means for recording the utterance received from the customer and the response sent from the agent to the customer in a conversation log.

37. A system as recited in claim 36, further comprising:
means for reviewing the conversation log to determine if the agent sent an improper response to the customer; and
means for editing the conversation log to correct the improper response if the agent sent the improper response to the customer.

38. A system as recited in claim 23, wherein the means for generating the response to the utterance received from the customer comprises:
means for determining if the response to the utterance received from the customer can be generated at the agent based on the knowledge base that comprises information extracted from the at least one exemplary conversation; and
means for sending the utterance received from the customer to a customer service representative if the response cannot be generated at the agent based on the knowledge base that comprises information extracted from the at least one exemplary conversation; and
means for generating the response to the utterance received from the customer at the customer service representative.

39. A system for training an agent to respond to a customer communication, comprising:
means for compiling at least one exemplary conversation, wherein the at least one exemplary conversation comprises an exchange of utterances;
means for annotating the compiled at least one conversation to categorize information contained therein;
means for processing the annotated at least one conversation using a machine learning engine to populate a knowledge base for use by the agent in generating a response to the customer communication.

40. A system as recited in claim 39, wherein the means for annotating the compiled at least one conversation comprises:
means for presenting a user with a plurality of categories for annotating the at least one conversation; and
means for associating respective ones of the plurality of categories with respective parts of the at least one conversation based on user input.

41. A system as recited in claim 40, wherein parts of the utterances comprising the at least one conversation comprise sentences and words.

42. A system as recited in claim 41, wherein the means for presenting the user with the plurality of categories comprises:
means for presenting the user with a plurality of categories based on intent for annotating the sentences; and
means for presenting the user with a plurality of categories based on semantic content for annotating the words.

43. A system as recited in claim 41, further comprising:
means for verifying that all words that are determinative to the meaning of utterances comprising the at least one conversation are annotated.

44. A system as recited in claim 39, wherein the at least one conversation comprises a conversation in which the agent was a participant.

45. A computer program product for responding to a customer communication, comprising:

a computer readable storage medium having computer readable program code embodied therein, the computer readable program code comprising:
computer readable program code for receiving an utterance from the customer at an agent executing on a data processing system;
computer readable program code for generating a response to the utterance received from the customer at the agent based on a knowledge base tat comprises information extracted from at least one exemplary conversation, wherein the at least one exemplary conversation comprises an exchange of utterances; and
computer readable program code for sending the response from the agent to the customer.

46. A computer program product as recited in claim 45, wherein the computer readable program code for generating the response to the utterance received from the customer comprises:
computer readable program code for analyzing the utterance received from the customer based on at least one of the following: at least one prior utterance received from the customer, at least one prior response sent from the agent to the customer, and the knowledge base that comprises the information extracted from the at least one exemplary conversation.

47. A computer program product as recited in claim 46, wherein the at least one prior utterance received from the customer and the at least one prior response sent from the agent to the customer provide a contextual framework for analyzing the utterance received from the customer.

48. A computer program product as recited in claim 46, further comprising:
computer readable program code for maintaining a conversation model having a current state that is representative of the at least one prior utterance received from the customer and the at least one prior response sent from the agent to the customer; and
computer readable program code for updating the current state of the conversation model based on the utterance received from the customer and the response sent from the agent to the customer.

49. A computer program product as recited in claim 46, wherein the computer readable program code for analyzing the utterance received from the customer comprises at least one of the following:
computer readable program code for recognizing the utterance received from the customer based on the knowledge base that comprises the information extracted from the at least one exemplary conversation; and
computer readable program code for recognizing a part of the utterance received from the customer based on the knowledge base that comprises the information extracted from the at least one exemplary conversation.

50. A computer program product as recited in claim 49, wherein the utterance received from the customer comprises a plurality of data strings, and wherein the computer readable program code for recognizing the part of the utterance received from the customer comprises at least one of the following:
computer readable program code for recognizing a sub-combination of the plurality of data strings based on the knowledge base that comprises the information extracted from the at least one exemplary conversation; and computer readable program code for recognizing one of the plurality of data strings based on the knowledge base that comprises the information extracted from the at least one exemplary conversation.

51. A computer program product as recited in claim 49, wherein the computer readable program code for recognizing the utterance received from the customer comprises computer readable program code for associating the utterance received from the customer with an information type that corresponds to at least one of a predefined information arrangement and a predefined information meaning.

52. A computer program product as recited in claim 49, wherein the computer readable program code for recognizing the part of the utterance received from the customer comprises associating the part of the utterance received from the customer with an information type that corresponds to at least one of a predefined information arrangement and a predefined information meaning.

53. A computer program product as recited in claim 46, further comprising:
   computer readable program code for sending the utterance received from the customer and the response sent from the agent to the customer to a customer service representative.

54. A computer program product as recited in claim 53, wherein the at least one prior utterance received from the customer and the at least one prior response sent from the agent to the customer provide a contextual framework for analyzing the utterance received from the customer, the computer program product further comprising:
   computer readable program code for maintaining a conversation model at the agent having a current state that is representative of the at least one prior utterance received from the customer and the at least one prior response sent from the agent to the customer;
   computer readable program code for updating the current state of the conversation model based on the utterance received from the customer and the response sent from the agent to the customer; and
   computer readable program code for sending the current state of the conversation model to the customer service representative.

55. A computer program product as recited in claim 45, further comprising:
   computer readable program code for receiving a notification from a customer service representative of intent to communicate with the customer.

56. A computer program product as recited in claim 55, wherein the computer readable program code for generating the response to the utterance received from the customer comprises:
   computer readable program code for generating at least one response to the utterance received from the customer at the agent based on the knowledge base that comprises information extracted from the at least one exemplary conversation; and wherein the computer readable program code for sending the response from the agent to the customer comprises:
   computer readable program code for sending the at least one response to the customer service representative;
   computer readable program code for receiving a selection of one of the at least one response from the customer service representative at the agent; and
   computer readable program code for sending the selected one of the at least one response from the agent to the customer.

57. A computer program product as recited in claim 55, further comprising:
   computer readable program code for receiving a proposed response from the customer service representative at the agent;
   computer readable program code for determining if the proposed response is appropriate to send to the customer;
   computer readable program code for sending the proposed response to a supervisor for approval if the proposed response is determined to be inappropriate; and
   computer readable program code for sending the proposed response to the customer if the proposed response is determined to be appropriate.

58. A computer program product as recited in claim 45, further comprising:
   computer readable program code for recording the utterance received from the customer and the response sent from the agent to the customer in a conversation log.

59. A computer program product as recited in claim 58, further comprising:
   computer readable program code for reviewing the conversation log to determine if the agent sent an improper response to the customer; and
   computer readable program code for editing the conversation log to correct the improper response if the agent sent the improper response to the customer.

60. A computer program product as recited in claim 45, wherein the computer readable program code for generating the response to the utterance received from the customer comprises:
   computer readable program code for determining if the response to the utterance received from the customer can be generated at the agent based on the knowledge base that comprises information extracted from the at least one exemplary conversation; and
   computer readable program code for sending the utterance received from the customer to a customer service representative if the response cannot be generated at the agent based on the knowledge base that comprises information extracted from the at least one exemplary conversation; and
   computer readable program code for generating the response to the utterance received from the customer at the customer service representative.

61. A computer program product for training an agent to respond to a customer communication, comprising:
   a computer readable storage medium having computer readable program code embodied therein, the computer readable program code comprising:
   computer readable program code for compiling at least one exemplary conversation, wherein the at least one exemplary conversation comprises an exchange of utterances;
   computer readable program code for annotating the compiled at least one conversation to categorize information contained therein;
   computer readable program code for processing the annotated at least one conversation using a machine learning engine to populate a knowledge base for use by the agent in generating a response to the customer communication.

62. A computer program product as recited in claim 61, wherein the computer readable program code for annotating the compiled at least one conversation comprises:

computer readable program code for presenting a user with a plurality of categories for annotating the at least one conversation; and computer readable program code for associating respective ones of the plurality of categories with respective parts of the at least one conversation based on user input.

63. A computer program product as recited in claim 62, wherein parts of the utterances comprising the at least one conversation comprise sentences and words.

64. A computer program product as recited in claim 63, wherein the computer readable program code for presenting the user with the plurality of categories comprises:

computer readable program code for presenting the user with a plurality of categories based on intent for annotating the sentences; and computer readable program code for presenting the user with a plurality of categories based on semantic content for annotating the words.

65. A computer program product as recited in claim 63, further comprising:

computer readable program code for verifying that all words that are determinative to the meaning of utterances comprising the at least one conversation are annotated.

66. A computer program product as recited in claim 61, wherein the at least one conversation comprises a conversation in which the agent was a participant.

* * * * *

UNITED STATES PATENT AND TRADEMARK OFFICE
CERTIFICATE OF CORRECTION

| | | |
|---|---|---|
| PATENT NO. | : 7,305,345 B2 | Page 1 of 1 |
| APPLICATION NO. | : 10/076963 | |
| DATED | : December 4, 2007 | |
| INVENTOR(S) | : Bares et al. | |

It is certified that error appears in the above-identified patent and that said Letters Patent is hereby corrected as shown below:

Column 12, Claim 17, Line 52:  Please correct "processing The"
                       To read -- processing the --

Column 13, Claim 21, Line 7:  Please correct "comprising The"
                       To read -- comprising the --

Column 16, Claim 45, Line 9:  Please correct "knowledge base tat"
                       To read -- knowledge base that --

Signed and Sealed this

First Day of April, 2008

JON W. DUDAS
*Director of the United States Patent and Trademark Office*